US008367175B2

(12) United States Patent
Badesha et al.

(10) Patent No.: US 8,367,175 B2
(45) Date of Patent: Feb. 5, 2013

(54) COATING COMPOSITIONS FOR FUSERS AND METHODS OF USE THEREOF

(75) Inventors: Santokh Badesha, Pittsford, NY (US); David J. Gervasi, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 930 days.

(21) Appl. No.: 12/177,343

(22) Filed: Jul. 22, 2008

(65) Prior Publication Data

US 2010/0021834 A1 Jan. 28, 2010

(51) Int. Cl.

| | |
|---|---|
| ***B32B 18/00*** | (2006.01) |
| ***B32B 27/18*** | (2006.01) |
| ***G03G 15/20*** | (2006.01) |

(52) U.S. Cl. .................... 428/36.91; 428/421; 428/447; 428/701; 399/333

(58) Field of Classification Search ....................... None
See application file for complete search history.

(56) References Cited

U.S. PATENT DOCUMENTS

| | | | | |
|---|---|---|---|---|
| 4,029,827 A * | 6/1977 | Imperial et al. | .......... | 430/124.37 |
| 5,500,298 A * | 3/1996 | Badesha | .................... | 428/411.1 |
| 5,668,203 A * | 9/1997 | Badesha et al. | .............. | 524/265 |
| 7,198,875 B2 | 4/2007 | Gervasi et al. | | |

* cited by examiner

*Primary Examiner* — Ramsey Zacharia
(74) *Attorney, Agent, or Firm* — MH2 Technology Law Group LLP

(57) ABSTRACT

There is disclosed a fuser member comprising a substrate; and an outer layer thereover comprising (a) a polymer and (b) an organometallic species, wherein said polymer and said organometallic species forms an interpenetrating network upon curing; and wherein the outer layer comprises an increased number of uniform organometallic binding sites, as compared to an outer layer devoid of the interpenetrating network. An image forming apparatus comprising the disclosed fuser member is also disclosed. Moreover, a method of forming a polymer system suitable for use in color fusing applications is disclosed.

12 Claims, 4 Drawing Sheets

COATING COMPOSITIONS FOR FUSERS AND METHODS OF USE THEREOF

DESCRIPTION OF THE INVENTION

1. Field of the Invention

This disclosure relates generally to crosslinked polymer materials. More specifically, the present disclosure is directed to crosslinked polymer materials suitable for applications such as fuser member coatings for high speed monochromatic and color imaging processes and the like.

2. Background of the Invention

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which can be the photosensitive member itself, or some other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser member, and accordingly it is desired to provide a fusing surface, which has a low surface energy to provide the necessary release. To ensure and maintain good release properties of the fuser roll, it has become customary to include a release layer comprising release agents to the fuser roll during the fusing operation. Typically, these materials are applied as thin films of, for example, nonfunctional silicone fluids or mercapto- or amino-functional silicone fluids, to prevent toner offset.

In forming the release layer, it is important to select the correct combination of fuser member surface material, any material(s) (e.g., filler) incorporated or contained therein, and fuser fluid. Specifically, it is important that the outer layer of the fuser member react sufficiently with the selected fuser fluid to obtain sufficient release. To improve the bonding of fuser fluids with the outer surface of the fuser member, materials such as fillers have been incorporated into or added to the outer surface layer of the fuser members. The use of a filler can decrease the amount of fusing oil necessary by promoting sufficient bonding of the fuser oil to the outer surface layer of the fusing member by providing bonding sites for the fuser fluid.

Yet while these filler-based release mechanisms are useful in black and white xerographic platforms, outer layers containing conventional fillers do not provide sufficient release for color xerographic fusers, where toner coverage is higher and fluid bonding sites on the surface of the fuser are limited. For example, functional fuser fluids are physically limited from reacting with conventional fillers by the availability of exposed copper oxide filler particles on the surface of a conventional filled outer layer. This leads to a shortfall of the release fluid to fully cover the fuser roll in fusing application that require higher area coverage, for example in color xerographic platforms and high speed production monochrome xerographic platforms. In the case of fusing color toner in color xerographic platforms, about 3 to about 10 times the amount of release agent is necessary to enhance release because of the need for a larger amount of color toner than is required for black and white copies and prints.

Therefore, an alternative to conventional fillers for high speed monochrome and color xerographic platforms is needed to address fusing issues and fuser life in color and high speed xerographic platforms.

SUMMARY OF THE INVENTION

According to various embodiments, there is provided a fuser member comprising a substrate; and an outer layer thereover comprising (a) a polymer and (b) an organometallic species, wherein said polymer and said organometallic species forms an interpenetrating network upon curing; and wherein the outer layer comprises an increased number of uniform organometallic binding sites, as compared to an outer layer devoid of the interpenetrating network.

According to various embodiments, there is also provided A method of forming a polymer system suitable for use in color fusing applications, said method comprising providing a polymer; dissolving said polymer in a solvent; adding a coupling silane comprising a nucleophilic functional group to form a slurry; adding to said slurry an organometallic species; and blending the resultant mixture with at least one crosslinking agent and optional additives selected from the group consisting of carbon fillers, metal fillers, metal oxide fillers, and boron nitride; and applying the crosslinked product to a fuser member.

According to various embodiments, there is further provided an image forming apparatus for forming color images on a recording medium comprising a charge-retentive surface to receive an electrostatic latent image thereon; a development component to apply toner to said charge-retentive surface to develop said electrostatic latent image to form a developed image on said charge retentive surface; a transfer component to transfer the developed image from said charge-retentive surface to a copy substrate; a fuser member for fusing toner images to a surface of said copy substrate, said fuser member comprising a substrate and an outer layer thereover comprising (a) a polymer and (b) an organometallic species, wherein said polymer and said organometallic species forms an interpenetrating network upon curing; and a functional release agent comprising a polyorganosiloxane.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
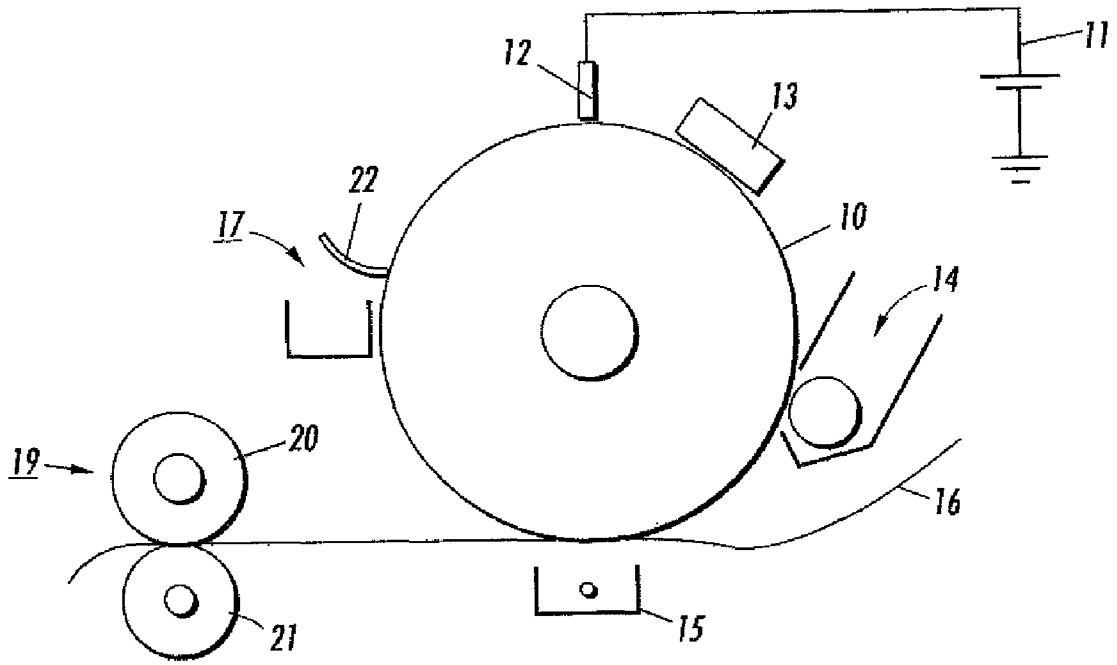
FIG. 1 depicts a general electrostatographic apparatus.

Reference will now be made in detail to the present embodiments (exemplary embodiments) of the disclosure, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore; merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” The term “at least one of” is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of “less than 10” can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as “less than 10” can assume negative values, e.g., −1, −2, −3, −10, −20, −30, etc.

The present disclosure relates to fuser members comprising a substrate and an outer layer thereover comprising (a) a polymer and (b) an organometallic species, wherein said polymer and said organometallic species forms an interpenetrating network upon curing. In an embodiment, the present disclosure relates to fuser members comprising an outer layer a substrate and an outer layer thereover comprising (a) a polymer and (b) an organometallic species, wherein said polymer and said organometallic species forms an interpenetrating network upon curing, and further comprising a release layer over the outer layer. The combination, in aspects, allows for sufficient release of the fuser member during the fusing process.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
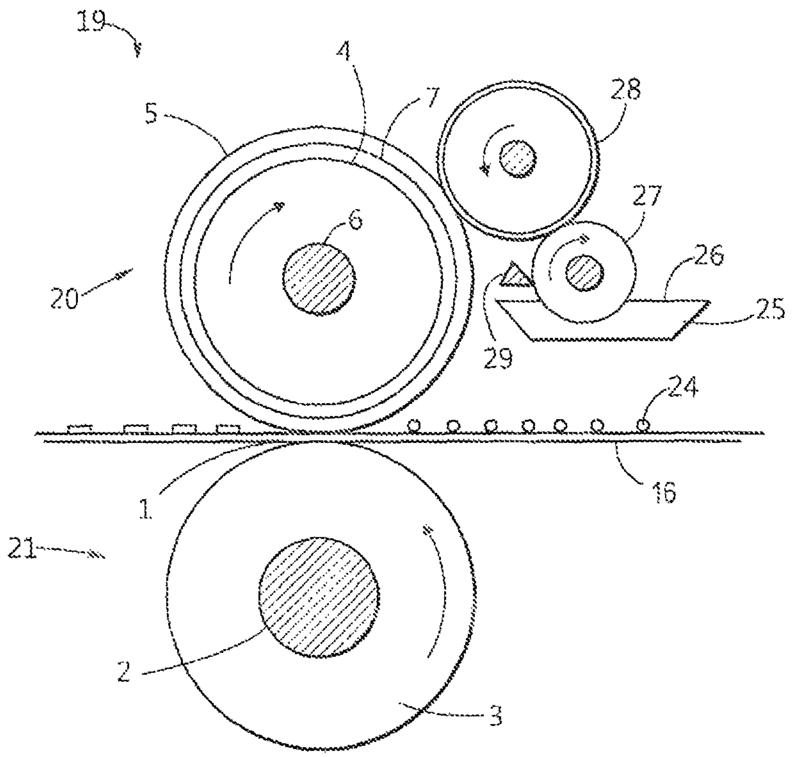
FIG. 2 depicts a fusing system in accordance with an embodiment of the present disclosure.

Referring to FIG. 2, an embodiment of a fusing station 19 is depicted with an embodiment of a fuser roll 20 comprising thermally stabilized crosslinked fluorosilicone polymer surface 5 on a suitable base member or substrate 4, which in this embodiment is a hollow cylinder or core fabricated from any suitable metal, such as aluminum, anodized aluminum, steel, nickel, copper, or the like, having a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact polymer or elastomer surface 5 of fuser roll 20. As shown in FIG. 2, an embodiment of a backup roll or pressure roll 21 is depicted as having a rigid steel core 2 with a polymer or elastomer surface or layer 3 thereon. Optional sump 25 contains optional polymeric release agent 26, which may be a solid or liquid at room temperature, but is a fluid at operating temperatures. The pressure member 21 can also optionally include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicron thickness to thicknesses of several microns of release fluid. Thus, by metering device 29, preferably from about 0.1 to about 2 microns or greater thicknesses of release fluid can be applied to the surface of polymer 5.

Figure 3:
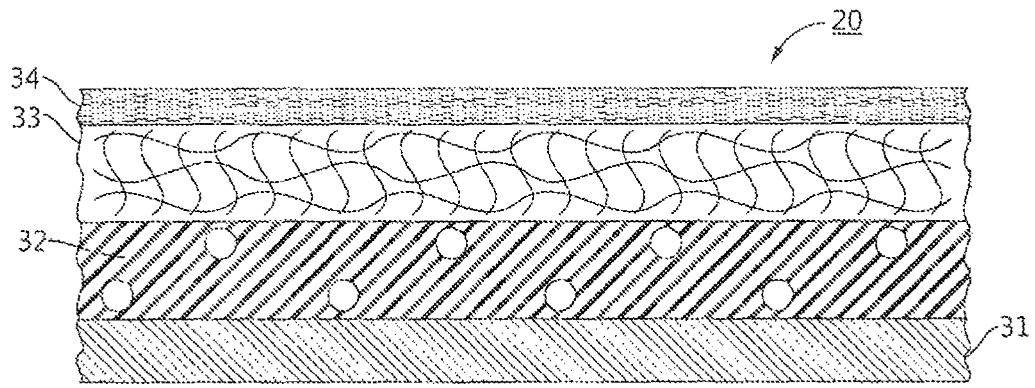
FIG. 3 depicts a cross-sectional view of an embodiment of the present disclosure, showing a fuser member with a substrate, intermediate layer, outer layer, and release agent coating layer.
Figure 4A:
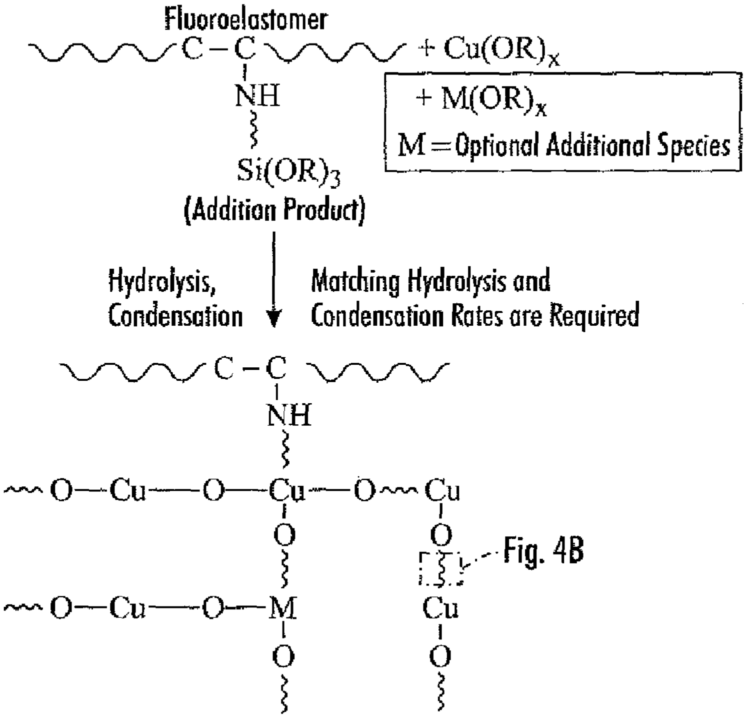
FIG. 4A depicts a reaction scheme of an embodiment of the present disclosure.
Figure 4B:
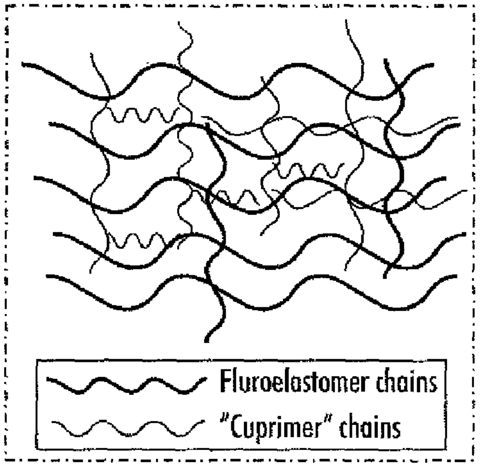
FIG. 4B depicts an enlarged detail of a reaction scheme of an embodiment of the present disclosure.
Figure 5:
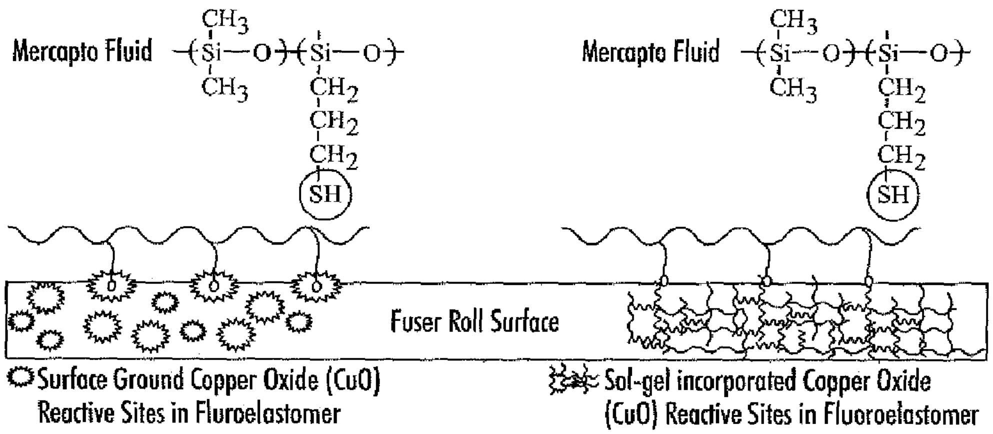
FIG. 5 depicts an embodiment of the present disclosure as compared to a conventional system.

FIG. 3 depicts an enlarged schematic view of an embodiment of a fuser member, demonstrating the various possible layers. As shown in FIG. 3, substrate 31 has intermediate layer 32 thereon. Intermediate layer 32 can be, for example, a rubber such as silicone rubber or other suitable rubber material. Over intermediate layer 32 is positioned outer layer 33 comprising an interpenetrating network as described below. Positioned on outer layer 33 is outermost fluid release layer 34.

As used herein, the term "fuser member" refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine. The fuser member of the present disclosure can be employed in a wide variety of machines, and is not specifically limited in its application to the particular embodiment depicted herein.

Any suitable substrate can be selected for the fuser member. The fuser member substrate can be a roll, belt, flat surface, sheet, film, or other suitable shape used in the fixing of thermoplastic toner images to a suitable copy substrate. It can take the form of a fuser member, a pressure member, or a release agent donor member, such as in the form of a cylindrical roll. Typically, the fuser member can be made of a hollow cylindrical metal core, such as copper, aluminum, stainless steel, or certain plastic materials chosen to maintain rigidity and structural integrity, as well as being capable of having a polymeric material coated thereon and adhered firmly thereto. In an aspect, the supporting substrate can be a cylindrical sleeve, and can include an outer polymeric layer of from about 1 to about 6 millimeters. In one embodiment, the core, which can be an aluminum or steel cylinder, is degreased with a solvent and cleaned with an abrasive cleaner prior to being primed with a primer, such as Dow Corning® 1200, which can be sprayed, brushed, or dipped, followed by air drying under ambient conditions for thirty minutes and then baked at 150° C. for thirty minutes.

Also suitable are quartz and glass substrates. The use of quartz or glass cores in fuser members allows for a light weight, low cost fuser system member to be produced. Moreover, the glass and quartz help allow for quick warm-up, and are therefore energy efficient. In addition, because the core of the fuser member comprises glass or quartz, there is a real possibility that such fuser members can be recycled. Furthermore, these cores allow for high thermal efficiency by providing superior insulation.

When the fuser member is a belt, the substrate can be of any desired or suitable material, including plastics, such as Ultem®, available from General Electric, Ultrapek®, available from BASF, PPS (polyphenylene sulfide) sold under the tradenames Fortron®, available from Hoechst Celanese, Ryton R-4®, available from Phillips Petroleum, and Supec®, available from General Electric; PAI (polyamide imide), sold under the tradename Torlon® 7130, available from Amoco; polyketone (PK), sold under the tradename Kadel® E1230, available from Amoco; PI (polyimide); polyaramide; PEEK (polyether ether ketone), sold under the tradename PEEK 450GL30, available from Victrex; polyphthalamide sold under the tradename Amodel®, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (Xydar®), available from Amoco; and the like, as well as mixtures thereof. These plastics can be filled with glass or other minerals to enhance their mechanical strength without changing their thermal properties. In certain aspects, the plastic comprises a high temperature plastic with superior mechanical strength, including, but not limited to, polyphenylene sulfide, polyamide imide, polyimide, polyketone, polyphthalamide, polyether ether ketone, polyethersulfone, and polyetherimide. Suitable materials also include silicone rubbers. Examples of belt-configuration fuser members are disclosed in, for example, U.S. Pat. Nos. 5,487,707 and 5,514,436, the disclosures of each of which are incorporated herein by reference. A method for manufacturing reinforced seamless belts is disclosed in, for example, U.S. Pat. No. 5,409,557, the disclosure of which is incorporated herein by reference.

The fuser member can comprise an outer layer over the substrate. The outer layer can comprise a polymer and an organometallic species. The polymers herein can include fluoropolymers. Suitable fluoropolymers for use herein include, but are not limited to, TEFLON®-like materials, such as polytetrafluoroethylene (PTFE), fluorinated ethylenepropylene copolymer (FEP), perfluorovinylalkylether tetrafluoroethylene copolymer (PFA TEFLON®), polyethersulfone, copolymers and terpolymers thereof, mixtures thereof, and the like. Also suitable are elastomers such as fluoroelastomers. Suitable fluoroelastomers are described in, for example, U.S. Pat. Nos. 5,166,031; 5,281,506; 5,366,772; 5,370,931; 4,257,699; 5,017,432; and 5,061,965, the disclosures each of which are incorporated by reference herein. These fluoroelastomers, for example from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E60C®, VITON E430®, VITON 910®, VITON GH®. VITON GF®, VITON E45® and VITON B50®. The VITON® designation is a trademark of E.I. DuPont de Nemours, Inc. Other commercially available materials include FLUOREL 2170®, FLUOREL 2174®, FLUOREL 2176®, FLUOREL 2177® and FLUOREL LVS 76®, FLUOREL® being a trademark of 3M Company. Additional commercially available materials include AFLAS® a poly(propylene-tetrafluoroethylene) and FLUOREL II® (LII900) a poly(propylene-tetrafluoroethylenevinylidenefluoride) both also available from 3M Company, as well as the TECNOFLONS® identified as FOR-60KIR®. FOR-LHF®, NM®, FOR-THF®, FOR-TFS®, TH®, TN505®, NH®, P959®, 819N®, available from Montedison Specialty Chemical Company. In an embodiment, the fluoroelastomer is one having a relatively low quantity of vinylidenefluoride, such as in VITON GF®, available from E.I. DuPont de Nemours, Inc. The VITON GF® has about 35 weight percent of vinylidenefluoride, about 34 weight percent of hexafluoropropylene, and about 29 weight percent of tetrafluoroethylene with about 2 weight percent cure site monomer. The cure site monomer can be those available from DuPont, such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

Other suitable polymers include, but are not limited to, polymer composites such as volume grafted elastomers, titamers, grafted titamers, ceramers, grafted ceramers, polyamide-polyorganosiloxane copolymers, polyimide-polyorganosiloxane copolymers, polyester-polyorganosiloxane copolymers, polysulfone-polyorganosiloxane copolymers, and the like. Titamers and grafted titamers are disclosed in, for example, U.S. Pat. No. 5,486,987, the disclosure of which is incorporated herein by reference in its entirety; and ceramers and grafted ceramers are disclosed in, for example, U.S. Pat. No. 5,337,129, the disclosure of which is incorporated herein by reference in its entirety. Volume grafted elastomers are a special form of hydrofluoroelastomer, and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in, for example, U.S. Pat. No. 5,166,031, U.S. Pat. No. 5,281,506, U.S. Pat. No. 5,366,772, and U.S. Pat. No. 5,370,931, the disclosures of each of which are incorporated herein by reference in their entirety. In addition, these fluoroelastomer composite materials are disclosed in U.S. Pat. No. 5,778,290, the disclosure of which is incorporated herein by reference in its entirety.

Other polymers suitable for use herein include silicone rubbers. Suitable silicone rubbers include room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RIV and SILASTIC® 732 RTV, both available from Dow Corning, and 106 RTV Silicone Rubber and 90 RPV Silicone Rubber, both available from General Electric Further examples of silicone materials include Dow Corning SILASTIC® 590 and 591, Sylgard 182, and Dow Corning 806A Resin. Other examples of silicone materials include fluorosilicones, such as nonylfluorohexyl and fluorosiloxanes, including DC94003 and Q5-8601, both available from Dow Corning. Silicone conformable coatings, such as X36765, available from Dow Corning, are also suitable. Other suitable silicone materials include silanes and siloxanes (for example polydimethylsiloxanes); fluorosilicones, such as Silicone Rubber 552, available from Sampson Coatings, Richmond, Va.; dimethylsilicones; liquid silicone rubbers, such as vinyl crosslinked heat curable rubbers or silanol room temperature crosslinked materials; and the like. Suitable silicone rubbers are available also from Wacker Silicones. In an embodiment, the polymer is a polydimethylsiloxane.

The outer layer can comprise an organometallic species. The organometallic species can form a substantially uniform, integral, interpenetrating network with the polymer, for example upon curing, to produce the outer layer. This substantially uniform, integral, interpenetrating network can provide a greater number of bonding sites for functional release fluids than an outer layer devoid of the interpenetrating network, for example, an outer layer comprising conventional copper oxide filler.

The organometallic species can be used to form fluoroelastomer composite materials, which are hybrid polymers comprising at least two distinguishing polymer systems, blocks, or monomer segments. The composite materials described herein can be hybrid or copolymer compositions comprising substantially uniform, integral, interpenetrating networks of a first monomer segment and a second monomer segment, and in some embodiments, optionally a third grafted segment, wherein both the structure and the composition of the segment networks are substantially uniform when viewed through different slices of the fuser member layer. As used herein, “interpenetrating network” is understood to mean a composite matrix wherein the strands of a first monomer or polymer segment (e.g., a fluoroelastomer) and a second monomer or polymer segment (e.g., an organometallic species), as well as those of an optional third monomer segment, are integrated and intertwined with one another at the molecular level. In other words, the second monomer or polymer segment (e.g., organometallic species) is not merely dispersed within the first monomer or polymer segment (e.g., fluoroelastomer), but rather the first and second monomer or polymer segments integrate and intertwine with each other at the molecular level.

Suitable organometallic species can be a sol-gel material comprising a metal oxide, metal hydroxide, or metal alkoxide. As used herein, a “sol-gel material” is understood to mean a material prepared by a procedure commonly referred to as a “sol-gel” process. In the sol-gel process, metal oxides, hydroxides, or alkoxides are hydrolyzed in an appropriate solvent, forming the “sol.” The solvent is then removed, resulting in the formation of a crosslinked “gel.”

The organometallic species can have the general formula $Cu(OR)_2$ (called “cuprimers”.) R can comprise a hydrocarbyl substituent comprising from about 1 to about 8 carbon atoms, for example from about 1 to about 4 carbon atoms. As used herein, the term “hydrocarbyl” is understood to mean that the substituent being described has predominantly hydrocarbon character within the context of this disclosure. This includes substituents that are purely hydrocarbon in nature, that is, they contain only carbon and hydrogen. They can also include substituents containing moieties or atoms which do not alter the predominantly hydrocarbon character of the substituent. Such moieties can include halo-, alkoxy-, nitro-, etc. These moieties also can contain hetero atoms. Suitable hetero atoms will be apparent to those skilled in the art and include, for example, sulfur, nitrogen, oxygen, and phosphorus. Therefore, while remaining predominantly hydrocarbon in character within the context of this invention, these moieties can contain atoms other than carbon present in a chain or ring otherwise composed of carbon atoms.

The organometallic species can further comprise optional species for additional branching. Such optional species can be, but are not limited to, species having the general formula $M(OR)_x$. M can comprise aluminum, silicon, titanium, zinc, zirconium, magnesium, calcium, lead, chromium, tin, antimony, or copper. R can comprise a hydrocarbyl substituent comprising from about 1 to about 8 carbon atoms, for example from about 1 to about 4 carbon atoms. Additionally, x can be an integer ranging from 2 to about 4.

Non-limiting examples of suitable metal oxides and metal hydroxides for use herein include tin oxide, zinc oxide, aluminum oxide, magnesium oxide, calcium hydroxide, lead oxide, chromium oxide, copper oxide, titanium dioxide, zirconium oxide, mixtures thereof, and the like. Non-limiting examples of suitable metal alkoxides include copper methoxide, copper ethoxide, aluminum methoxide, aluminum ethoxide, silicon methoxide, silicon ethoxide, titanium methoxide, titanium ethoxide, zinc methoxide, zinc ethoxide, mixtures thereof, and the like. A variety of solvents can be used in the sol-gel process, including, but not limited to, aqueous, aqueous-alcoholic, and alcoholic solvents.

In an embodiment, the organometallic species is not titanium oxide, titanium alkoxide, silicon oxide, or zirconium oxide. In another embodiment, the organometallic species is a copper alkoxide, such as copper methoxide or copper ethoxide.

The outer layer can be coated on the fuser member to a thickness of from about 2 to about 80 microns, or from about 5 to about 60 microns, or from about 10 to about 40 microns.

In an aspect, the outer layer can be formed by dissolving a fluoroelastomer in a suitable solvent, such as methyl isobutyl ketone (MIK) or methyl ethyl ketone (MEK). The fluoroelastomer can then be reacted with a coupling silane having a nucleophilic functional group. (Without being limited by theory, it is believed that the nucleophilic functional group can bond to the polymer backbone, leaving the organo-functional segments available for hydrolysis and condensation reactions with an organometallic species.) Thereafter, the organometallic species can be added, and the resultant formulation can be blended with crosslinking chemicals and further optional additives to form an interpenetrating network.

Any crosslinking agent can be employed. Non-limiting examples of suitable crosslinking agents include hydrogen peroxide; organic peroxides commonly used as crosslinking agents; organic diamine curatives, such as hexamethylene diamine carbamate and N,N'-dicinnamylidene-1,6-hexanediamine (commercially available from E.I. DuPont de Nemours and Co. as Diak® No. 1 and Diak® No. 3, respectively); and the like. The crosslinking agent can be present in the composition in any desired or effective amount, for example from about 1 to about 10 percent by weight of the total composition. The crosslinked product can then be applied to a fuser member.

While the crosslinked polymeric outer layer of the present disclosure has been described with respect to its suitability for use as fuser member layers, the crosslinked polymeric layer of the present disclosure is also suitable for use in any other application wherein materials possessing release or solvent resistance properties exhibited by polymers such as fluoroelastomers are desirable, such as intermediate transfer belt materials and the like.

In an aspect, polymeric fluid release agents can be used in combination with the polymeric outer layer to form a layer of fluid release agent ("release layer") which results in an interfacial barrier at the surface of the fuser member while leaving a non-reacted low surface energy release fluid as an outer release film. Suitable release agents include both functional and non-functional fluid release agents. The term "non-functional fluid" as used herein refers to a release agent which does not react chemically with the fillers on the surface of the fuser member. The term "functional fluid" as used herein refers to a release agent having functional groups which react chemically with the organometallic species present on the surface of the fuser member so as to reduce the surface energy and thereby provide better release of toner particles from the surface of the fuser member.

Non-functional fluids include known polydimethyl siloxane release agents. Functional fluids, such as release agents having amino-functional groups, mercapto-functional groups, hydride-functional groups, hydroxy-functional groups, mixtures thereof, and others, can also be used. Specific examples of suitable amino-functional release agents include T-Type amino functional silicone release agents, as disclosed in, for example U.S. Pat. No. 5,516,361, monoamino functional silicone release agents, as described in, for example U.S. Pat. No. 5,531,813, and amino-functional siloxane release agents, as disclosed in, for example, U.S. Pat. No. 5,512,409, the disclosures of each of which are incorporated herein by reference in its entirety. Examples of mercapto-functional release agents include those disclosed in, for example, U.S. Pat. No. 4,029,827, U.S. Pat. No. 4,029,827, and U.S. Pat. No. 5,395,725, the disclosures of each of which are incorporated herein by reference in its entirety. Examples of hydride-functional oils include those disclosed in, for example, U.S. Pat. No. 5,401,570, the disclosure of which is incorporated herein by reference in its entirety. Other functional release agents include those described in, for example, U.S. Pat. No. 4,101,686, U.S. Pat. No. 4,146,659, and U.S. Pat. No. 4,185,140, the disclosures of each of which are incorporated herein by reference in its entirety. Other release agents include those described in, for example, U.S. Pat. No. 4,515,884 and U.S. Pat. No. 5,493,376, the disclosures of each of which are incorporated herein by reference in its entirety.

While amino-functional silicone fluids have been used with fluoroelastomer fuser member outer layers, use of such fluids present a number of post-fuse issues because amino silicone fluids do not diffuse into paper products but instead react with the cellulose in the paper, and therefore remain on the surface of the paper. Without being limited by theory, it is believed that hydrogen bonding occurs between the amine groups in the amino fluid and the cellulose hydroxy groups of the paper. Alternatively, the amine groups may hydrolyze the cellulose rings in the paper. The amino silicone fluid on the surface of the copied paper prevents the binding of glues and adhesives, including attachable notes (such as adhesives of 3M Post-It® notes), to the surface of the copied paper. In addition, the amino silicone fluid present on the surface of a copied paper prevents ink adhesion to the surface of the paper. This problem results in the poor fix of inks, such as bank check endorser inks, and other similar inks. Thus, post-fusing issues associated with the use of amine-functional fuser fluids make it attractive to use mercapto-functional or other functional silicone release fluids that do not react with and adhere to paper surfaces.

In an aspect, the release layer comprises a functional release agent. In an embodiment, the functional release agent is a functional polyorganosiloxane, such as a mercapto-functional polydimethylsiloxane.

In another aspect, the disclosed crosslinked polymeric outer layer comprising a polymer and an organometallic species provides an increased number of substantially uniform binding sites, which are capable of interacting with any functional groups of the release agent to provide adequate release of toner particles from the surface of the fuser member in color xerographic and high speed monochromatic xerographic platforms, as compared to an outer layer devoid of the interpenetrating network. This interaction enables a reduction in the amount of oil needed to promote release.

Other additives such as adjuvants and fillers may be incorporated in the layers in accordance with the present disclosure provided that they do not affect the integrity of the polymer material. Such additives normally encountered in the compounding of elastomers include coloring agents, reinforcing fillers, and processing aids. Oxides, such as magnesium oxide, and hydroxides, such as calcium hydroxide, can be suitable for use in curing many fluoroelastomers. Proton acids, such as stearic acid, are suitable additives in ethylene propylene diene monomer rubber (EPDM) and butadiene rubber (BR) polymer formulations to improve release by improving bonding of amino oils to the elastomer composition. Metal oxides, such as copper oxide, aluminum oxide, magnesium oxide, tin oxide, titanium oxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. The addition of silicone particles to a fluoropolymer outer layer can increase release of toner from the fuser member during and following the fusing process. Processability of a fluoropolymer outer layer can be increased by increasing absorption of silicone oils, in particular by adding fillers such as fumed silica or clays such as organo-montmorillonites. Inorganic particulate fillers can increase the abrasion resistance of the polymeric outer fusing layer. Examples of such fillers include metal-containing fillers, such as a metal, metal alloy, metal oxide, metal salt, or other metal compound; the general classes of suitable metals include those metals of Groups 1b, 2a, 2b, 3a, 3b, 4a, 4b, 5a, 5b, 6b, 7b, 8, and the rare earth elements of the Periodic Table. Specific examples of such fillers are oxides of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel, and alloys thereof. Also suitable are reinforcing calcined alumina and non-reinforcing tabular alumina.

The fuser member can further comprise an optional intermediate layer positioned between the substrate and the outer layer. The optional intermediate layer can be of any suitable or desired material. For example, the optional intermediate layer can comprise a silicone rubber of a thickness sufficient to form a conformable layer. Examples of suitable materials which can comprise the intermediate layer include those listed above as useful in the polymeric outer layer. For example, suitable silicone rubbers include, but are not limited to, RTV silicone rubbers, HTV silicone rubbers, and LTV silicone rubbers. These rubbers are known and are readily available commercially as SILASTIC® 735 black RTV and SILASTIC® 732 RTV, and 106 RTV Silicone Rubber and 90 RTV Silicone Rubber. Other suitable silicone materials include, but are not limited to, silanes and siloxanes (e.g., polydimethylsiloxanes); fluorosilicones, such as Silicone Rubber 552; dimethylsilicones; liquid silicone rubbers, such as vinyl crosslinked heat curable rubbers or silanol room temperature crosslinked materials; and the like. Other materials suitable for the intermediate layer include polyimides and fluoroelastomers, including those set forth above.

The optional intermediate layer can have a thickness of from about 0.05 to about 10 millimeters, such as from about 0.1 to about 5 millimeters, for example from about 1 to about 3 millimeters. More specifically, when present on a fuser member, the intermediate layer can have a thickness of from about 1 to about 10 millimeters, such as from about 2 to about 5 millimeters, for example from about 2.5 to about 3 millimeters.

Other layers such as adhesive layers or other suitable layers may be incorporated between the outer polymer layer and the intermediate silicone rubber layer, or between the substrate and the intermediate silicone rubber layer.

The outer and intermediate layers of the present disclosure can be coated on the fuser member substrate by any means including normal spraying, dipping and tumble spraying techniques. A flow coating apparatus as described in U.S. Pat. No. 6,408,753, the disclosure of which is hereby incorporated herein in its entirety, can also be used to flow coat a series of fuser rolls. In an embodiment, the polymers can be diluted with a solvent, and particularly an environmentally friendly solvent, prior to application to the fuser substrate. However, alternative methods can be used for coating layer including methods described in U.S. Pat. No. 6,099,673, the disclosure of which is hereby incorporated by reference in its entirety.

Also disclosed herein is a method of forming a polymer system suitable for use in color fusing applications comprising providing a polymer; dissolving said polymer in a solvent; adding a coupling silane comprising a nucleophilic functional group to form a slurry; adding to said slurry an organometallic species; and blending the resultant mixture with at least one crosslinking agent. The method can further comprise adding optional additives with the at least one crosslinking agent. These optional additives can include those set forth above.

Further disclosed herein is an image forming apparatus for forming color images on a recording medium comprising a charge-retentive surface to receive an electrostatic latent image thereon; a development component to apply toner to said charge-retentive surface to develop said electrostatic latent image to form a developed image on said charge retentive surface; a transfer component to transfer the developed image from said charge-retentive surface to a copy substrate; a fuser member for fusing toner images to a surface of said copy substrate, said fuser member comprising a substrate and an outer layer thereover comprising (a) a polymer and (b) an organometallic species, wherein said polymer and said organometallic species forms an interpenetrating network upon curing; and a functional release agent comprising a polyorganosiloxane.

Additionally disclosed herein is a process comprising generating an electrostatic latent image on an imaging member; developing the latent image by contacting the imaging member with a developer; transferring the developed image to a copy substrate; and affixing the developed image to the copy substrate by contacting the developed image with a fuser member comprising a substrate and an outer layer thereover comprising (a) a polymer and (b) an organometallic species, wherein said polymer and said organometallic species forms an interpenetrating network upon curing.

EXAMPLES

Comparative Example 1

A fluoroelastomer, Viton GF, available from Dupont-Dow Elastomers, was dissolved into an appropriate solvent, such as MIBK or MEK, to a suitable viscosity for coating. For this component and coating method, a suitable viscosity is in the range of 100-600cP. A dispersion of typical fluoroelastomer curative package ingredients, namely calcium hydroxide, magnesium hydroxide and VC-50 (benzyltriphenylphosphonium bisphenol AF salt, also available from Dupont-Dow Elastomers), was added to this dissolved fluoroelastomer solution by normal mixing techniques in amounts to achieve sufficient physical properties. The resulting composition was applied to a fuser roll as an overcoat material.

Comparative Example 2

A fluoroelastomer, Viton GF, available from Dupont-Dow Elastomers, was dissolved in a suitable solvent, such as MIBK or MEK to a suitable viscosity for coating. The fluoroelastomer solution is reacted with a coupling silane, 3-(N-styrylmethyl-2-aminoethylamino)propyltrimethoxysilane hydrochloride, available from Gelest, Inc. The nucleophilic functional group bonds to the polymer backbone, with the organo-functional segments available for hydrolysis and condensation reactions with an organometallic species, in this case Copper (II) ethoxide, available from Gelest, Inc. The amount of copper (II) ethoxide added to the mixture was 30 pph relative to solid fluoroelastomer portion of the mixture. The resulting formulation was blended with conventional additives and crosslinking chemicals. The composition from this example can be coated on a fuser member and installed in machine and it is anticipated that improved chemical anchoring of a mercapto-functional fuser oil and improved thermal conductivity will result.

Figure 6:
FIG. 6 depicts a Time of Flight Secondary Ion Mass Spectrometry (TOFSIMS) analysis of cross section of an embodiment of the present disclosure.

FIG. 6 shows a Time of Flight Secondary Ion Mass Spectrometry (TOFSIMS) analysis of cross section of a film fabricated as described in Example 2 (bar marker=100 microns). As can be seen in FIG. 6, the ion image for copper (mass=63d for the Cu+ ion) demonstrates that copper is uniformly distributed through the film. There is no evidence of a concentration gradient.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

it is noted that, as used in this specification and the appended claims, the singular forms "a," "an," and "the," include plural referents unless expressly and unequivocally limited to one referent. Thus, for example, reference to "a substrate" includes two or more different substrates. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art Accordingly, the appended claims as filed and as they can be amended are intended to embrace all such alternatives, modifications variations, improvements, and substantial equivalents.

What is claimed is:

1. A fuser member comprising:

a substrate; and a cured outer layer thereover, the outer layer made by combining ingredients comprising (a) a polymer and (b) an organometallic species, wherein the organometallic species is a sol-gel having the formula $Cu(OR)_2$, R being a hydrocarbyl substituent comprising from about 1 to about 8 carbon atoms, and further wherein said polymer and said organometallic species forms an interpenetrating network upon curing; and wherein the fuser is usable with a mercapto-functional polydimethylsiloxane release fluid, the outer layer of the fuser comprising an increased number of uniform organometallic binding sites for a mercapto-functional polydimethylsiloxane release fluid, as compared to an outer layer devoid of the interpenetrating network.

2. The fuser member of claim 1, further comprising an organometallic species having the formula M(OR)x, wherein M is selected from the group consisting of aluminum, silicon, titanium, zinc, zirconium, magnesium, calcium, lead, chromium, tin, antimony, and copper;

wherein x is an integer ranging from about 2 to about 4; and wherein R is a hydrocarbyl substituent comprising from about 1 to about 8 carbon atoms.

3. The fuser member of claim 1, wherein the polymer is an elastomer or composite polymer.

4. The fuser member of claim 3, wherein said elastomer is a fluoroelastomer.

5. The fuser member of claim 1, further comprising a release layer over the outer layer, said release layer comprising a functional release agent or a non-functional release agent.

6. The fuser member of claim 5, wherein said release agent comprises a polyorganosiloxane.

7. The fuser member of claim 6, wherein said polyorganosiloxane is polydimethylsiloxane.

8. The fuser member of claim 7, wherein said polydimethylsiloxane comprises functional groups selected from the group consisting of amine functional groups, hydride functional groups, mercapto functional groups, hydroxy functional groups, and mixtures thereof.

9. The fuser member of claim 5, further comprising an electrically conductive filler selected from the group consisting of carbon fillers, metal fillers, metal oxide fillers, boron nitride, and mixtures thereof.

10. The fuser member of claim 1, further comprising an intermediate layer positioned between the substrate and the outer layer.

11. The fuser member of claim 1, wherein the substrate is in the form of a belt or a roller.

12. A fuser member comprising:

a substrate;

a cured outer layer thereover, the outer layer made by combining ingredients comprising (a) a polymer and (b) an organometallic species; and a release layer over the outer layer, said release layer comprising mercapto-functional polydimethylsiloxane, wherein the organometallic species is a sol-gel having the formula $Cu(OR)_2$, R being a hydrocarbyl substituent comprising from about 1 to about 8 carbon atoms, and further wherein said polymer and said organometallic species forms an interpenetrating network upon curing; and wherein the outer layer comprises an increased number of uniform organometallic binding sites for the mercapto-functional polydimethylsiloxane, as compared to an outer layer devoid of the interpenetrating network.

* * * * *